(12) United States Patent
Juestel et al.

(10) Patent No.: US 6,794,821 B2
(45) Date of Patent: Sep. 21, 2004

(54) PLASMA PICTURE SCREEN WITH MIXED PARTICLE PHOSPHOR

(75) Inventors: Thomas Juestel, Aachen (DE); Hans-Helmut Bechtel, Roetgen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 45 days.

(21) Appl. No.: 10/011,893

(22) Filed: Dec. 6, 2001

(65) Prior Publication Data

US 2002/0113552 A1 Aug. 22, 2002

(30) Foreign Application Priority Data

Dec. 12, 2000 (DE) .......................................... 100 61 720

(51) Int. Cl.[7] .............................................. H01J 17/49
(52) U.S. Cl. ........................................ 313/587; 313/486
(58) Field of Search .................................. 313/582–587, 313/483–486; 252/301.4 R, 301.4 S, 301.6 S, 301.3 S

(56) References Cited

U.S. PATENT DOCUMENTS 5,972,528 A * 10/1999 Kim ............................ 313/584
6,302,959 B2 * 10/2001 Srivastava et al. ............ 117/81

FOREIGN PATENT DOCUMENTS

DE 19727607 1/1999 ............ H01J/29/20

* cited by examiner

Primary Examiner—Joseph Williams

(57) ABSTRACT

The invention relates to a plasma picture screen provided with a phosphor layer (9) which comprises a mixed particle mixture of a standard phosphor and a further phosphor which emits the same color. The use of two phosphors in one phosphor layer (9) renders it possible for undesirable properties of the phosphors to cancel each other out.

13 Claims, 3 Drawing Sheets

PLASMA PICTURE SCREEN WITH MIXED PARTICLE PHOSPHOR

BACKGROUND AND SUMMARY

1. Technical Field

The invention relates to a plasma picture screen provided with a front plate comprising a glass plate on which a dielectric layer and a protective layer are provided, with a carrier plate provided with a phosphor layer, with a ribbed structure which subdivides the space between the front plate and the carrier plate into plasma cells which are filled with a gas, and with one or several electrode arrays on the front plate and the carrier plate for generating electrical corona discharges in the plasma cells.

2. Description

Plasma picture screens render possible color pictures with high resolution and large picture screen diagonals and are of a compact construction. A plasma picture screen comprises a hermetically closed glass cell which is filled with a gas, with electrodes in a grid arrangement. The application of a voltage triggers a gas discharge which generates light in the ultraviolet range. This light can be converted into visible light by means of phosphors and be emitted to the viewer through the front plate of the glass cell.

In plasma picture screens commercially available nowadays, $BaMgAl_{10}O_{17}$:Eu (BAM) is mostly used as the blue phosphor, $Zn_2SiO_4$:Mn (ZSM) as the green phosphor, and (Y,Gd)$BO_3$:Eu (YGB) as the red phosphor. The choice of these phosphors was made mainly on the basis of their luminous efficacy upon excitation by VUV radiation and their color points. The color points of the phosphors used play a very important part in emitting picture screens because they determine the maximum achievable color space.

All of the selected phosphors, however, have certain disadvantages which cannot be easily eliminated. Thus the blue phosphor $BaMgAl_{10}O_{17}$:Eu shows a strong decrease in brightness when irradiated with VUV. Owing to this degradation, the white color point of the plasma picture screen is shifted towards the yellowish orange, because the green and in particular the red phosphor are degraded less strongly.

The green phosphor $Zn_2SiO_4$:Mn has a comparatively long decay time of approximately 10 ms and only a moderately good luminous efficacy when excited by VUV light. The efficacy clearly decreases, moreover, at increasing luminance owing to saturation. In addition, its stability is also less than that of the red phosphor (Y,Gd)$BO_3$:Eu when excited by VUV light.

The red phosphor (Y,Gd)$BO_3$:Eu is indeed very efficient under excitation by VUV light, but its color point is less red than that of $Y_2O_2S$:Eu, which is used in cathode ray tubes.

To avoid the disadvantages of the individual phosphors described above, the phosphors are, for example, provided with a coating, or alternative phosphors are synthesized. DE 197 27 607, for example, discloses a blue-emitting aluminate phosphor with a coating of catena-polyphosphate of one or several alkaline earth metals, zinc, Camden, and/or manganese. The coating of catena-polyphosphate achieves that the degradation of the phosphor by the VUV excitation is reduced. Until now, however, no alternative phosphors to the three standard phosphors $BaMgAl_{10}O_{17}$:Eu, $Zn_2SiO_4$:Mn, and (Y,Gd)$BO_3$:Eu which fulfill all the requirements and are capable of replacing said three phosphors could be synthesized.

It is accordingly an object of the present invention to avoid the disadvantages of the present art situation and to make available an improved plasma picture screen.

This object is achieved by means of a plasma picture screen provided with a front plate comprising a glass plate on which a dielectric layer and a protective layer are provided, with a carrier plate provided with a phosphor layer comprising a mixed particle mixture of at least two phosphors which emit the same color, with a ribbed structure which subdivides the space between the front plate and the carrier plate into plasma cells which are filled with a gas, and with one or several electrode arrays on the front plate and the carrier plate for generating electrical corona discharges in the plasma cells.

The use of two phosphors which emit the same color in one and the same phosphor layer makes it possible to reduce or mutually compensate the undesirable properties of the phosphors.

It is preferred that the phosphor layer is subdivided into individual color segments, and at least one segment comprises a mixed particle mixture of at least two phosphors which emit the same color.

The phosphor layer of a plasma picture screen usually comprises several color segments, each with its own phosphor which emits in the color blue, green, or red. The use of two different phosphors which emit the same color in one color segment is capable of improving the properties of this color segment.

It is particularly preferred that a color segment of the phosphor layer comprises a mixed particle mixture of $BaMgAl_{10}O_{17}$:Eu and a phosphor chosen from the group of $Ce^{3+}$-activated phosphors and $Tm^{3+}$-activated phosphors.

The luminous decrement of a blue-emitting phosphor and of a blue-emitting color segment of a phosphor layer during the operational life of a plasma picture screen can be lessened because $Ce^{3+}$-activated phosphors and $Tm^{3+}$-activated phosphors have a higher stability under irradiation with VUV light than $BaMgAl_{10}O_{17}$:Eu.

It is particularly highly preferred that the $Ce^{3+}$-activated phosphor is chosen from the group of $YBO_3$:Ce and $(Y_{1-x}Gd_x)BO_3$:Ce, with $0 \leq x \leq 1$.

It is also particularly preferred that the $Tm^{3+}$-activated phosphor is $LaBO_3$:Tm.

The color point of a blue-emitting color segment of a phosphor layer may be further improved because $YBO_3$:Ce, $(Y_{1-x}Gd_x)BO_3$:Ce with $0 \leq x \leq 1$ and $LaBO_3$:Tm have a deeper blue emission color than $BaMgAl_{10}O_{17}$:Eu.

It is furthermore preferred that a color segment of the phosphor layer comprises a mixed particle mixture of $Zn_2SiO_4$:Mn and a $Tb^{3+}$-activated phosphor.

The luminous decrement of a green-emitting color segment of a phosphor layer during the operational life of a plasma picture screen can be lessened because $Tb^{3+}$-activated phosphors have a higher stability than $Zn_2SiO_4$:Mn under irradiation with VUV light. This is because $Tb^{3+}$ can be oxidized to $Tb^{4+}$ with difficulty only, whereas $Mn^{2+}$ is very prone to oxidation. The luminous efficacy of a green-emitting color segment of a phosphor layer, moreover, can be enhanced, especially at higher luminance levels. In addition, the color brilliance of a green-emitting color segment is improved owing to a lower saturation.

It is advantageous when the $Tb^{3+}$-activated phosphor is chosen from the group of $LaPO_4$:Ce,Tb, $Y_2SiO_5$:Tb, $GdMgB_5O_{10}$:Ce,Tb, $CeMgAl_{11}O_{19}$:Tb, $GdBO_3$:Tb, $(Y_{1-x}Gd_x)BO_3$:Tb, with $0 \leq x \leq 1$, $YBO_3$:Tb, $LaOCl$:Tb and $InBO_3$:Tb.

These $Tb^{3+}$-activated phosphors have a shorter decay time than $Zn_2SiO_4$:Mn. Motion artefacts in the picture composition can be reduced by means of a mixed particle mixture of these $Tb^{3+}$-activated phosphors with $Zn_2SiO_4$:Mn in a green-emitting color segment of a phosphor layer.

It may be preferable, in addition, that a color segment of the phosphor layer comprises a mixed particle mixture of (Y,Gd)$BO_3$:Eu and a second red-emitting phosphor whose color point (x,y) has a y-value <0.36.

The color point of a red-emitting color segment of a phosphor layer can be improved through the use of a mixed particle mixture of (Y,Gd)$BO_3$:Eu and a phosphor whose emission color lies less in the orange, and more in the red region of the color triangle.

It is advantageous when the second red-emitting phosphor is chosen from the group of $Y_2O_3$:Eu, $YVO_4$:Eu, Y(V,P)$O_4$:Eu and $(Y_{1-x}Gd_x)_2O_3$:Eu, with $0 \leq x \leq 1$.

These $Eu^{3+}$-activated phosphors have a shorter decay time than (Y,Gd)$BO_3$:Eu, whereby also motion artefacts in the picture composition can be reduced.

The invention will be explained in more detail below with reference to a drawing and an embodiment.

DETAILED DESCRIPTION

Figure 1:
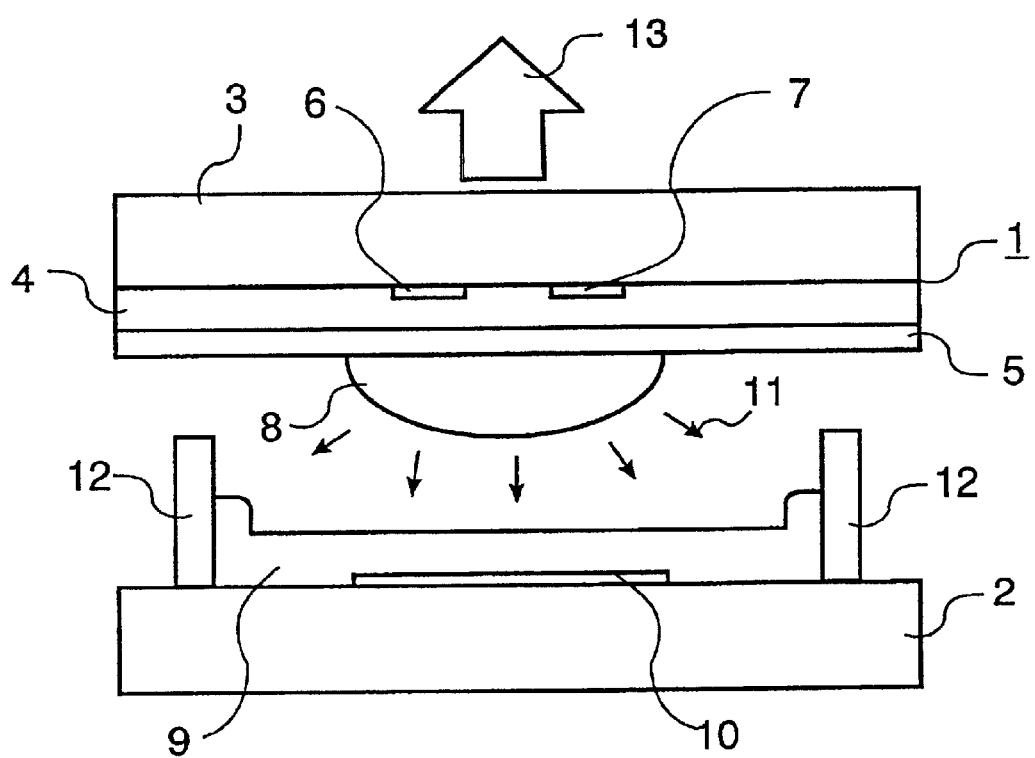
FIG. 1 shows the construction and working principle of a single plasma cell in a plasma picture screen.

In FIG. 1, a plasma cell of an AC plasma picture screen with a coplanar arrangement of electrodes comprises a front plate 1 and a carrier plate 2. The front plate 1 comprises a glass plate 3 on which a dielectric layer 4 and a superimposed protective layer 5 have been provided. The protective layer 5 is preferably made of MgO and the dielectric layer 4, for example, of glass containing PbO. Parallel, strip-shaped discharge electrodes 6, 7 are provided on the glass plate 3 and are covered by the dielectric layer 4. The discharge electrodes 6, 7 are made, for example, of metal or ITO. The carrier plate 2 is made of glass, and parallel, strip-shaped address electrodes 10, for example made of Ag, are provided on the carrier plate 2 so as to run perpendicular to the discharge electrodes 6, 7. Said address electrodes 10 are covered a phosphor layer 9 which emits light in one of the three basic colors red, green, and blue. The phosphor layer 9 is subdivided into several color segments 20 for this purpose. An exemplary configuration is shown in FIG. 5. Usually, the red-, green-, and blue-emitting color segments 20 of the phosphor layer 9 are provided in the form of perpendicular stripe triads. The individual plasma cells are separated by a ribbed structure 12 with separating ribs which are preferably made of a dielectric material.

A gas is present in the plasma cell, and also between the discharge electrodes 6, 7, of which one acts alternately as the anode and cathode and vice versa each time, preferably a rare gas mixture of, for example, He, Ne, or Kr with Xe as the UV light generating component. After ignition of the surface discharge, whereby charges can flow along a discharge path lying between the discharge electrodes 6, 7 in the plasma region 8, a plasma is formed in the plasma region 8, which generates radiation 11 in the UV range, in particular in the VUV range, depending on the composition of the gas. This radiation 11 excites the phosphor layer 9 into luminescence, thus emitting visible light 13 in one of the three basic colors, which light issues through the front plate 1 to the exterior and forms a luminous pixel on the picture screen.

The dielectric layer 4 lying over the transparent discharge electrodes 6, 7 in AC plasma picture screens serves inter alia to prevent a direct discharge between the discharge electrodes 6, 7 made of a conductive material and thus the formation of a light arc upon ignition of the discharge.

At least one color segment of the phosphor layer 9 comprises a mixed particle mixture of at least two phosphors. A mixed particle mixture is understood to be a mixed particle aggregate comprising at least two substances.

A blue-emitting color segment of the phosphor layer 9 comprises besides $BaMgAl_{10}O_{17}$:Eu also a $Ce^{3+}$-activated phosphor or a $Tm^{3+}$-activated phosphor. The $Ce^{3+}$-activated phosphor may be chosen, for example, from the group comprising $YBO_3$:Ce and $(Y_{1-x}Gd_x)BO_3$:Ce, with $0 \leq x \leq 1$, and the $Tm^{3+}$-activated phosphor may be, for example, $LaBO_3$:Tm.

As is shown in Table 1, $YBO_3$:Ce, $(Y_{1-x}Gd_x)BO_3$:Ce, with $0 \leq x \leq 1$, and $LaBO_3$:Tm each have a decay time smaller than 0.1 ms. Furthermore, the x-value of the color points of the three phosphors is $\leq 0.168$, and accordingly the emissions colors of these phosphors show a deeper blue than that of $BaMgAl_{10}O_{17}$:Eu. In addition, the three phosphors give a high luminous efficacy upon irradiation with VUV light and a higher stability than $BaMgAl_{10}O_{17}$:Eu.

TABLE 1

Decay times and color points of suitable blue-emitting $Ce^{3+}$- and $Tm^{3+}$-activated phosphors

| Phosphor | Decay Time [ms] | Color Point [x, y] |
| --- | --- | --- |
| $YBO_3$:Ce | <0.1 | 0.165, 0.027 |
| $(Y_{0.5}Gd_{0.5})BO_3$:Ce | <0.1 | 0.168, 0.030 |
| $LaBO_3$:Tm | <0.1 | 0.168, 0.060 |

A green-emitting color segment of the phosphor layer 9 comprises $Zn_2SiO_4$:Mn and a $Tb^{3+}$-activated phosphor such as, for example, $LaPO_4$:Ce,Tb,$Y_2SiO_5$:Tb, $GdMgB_5O_{10}$:Ce, Tb, $CeMgAl_{11}O_{19}$:Tb, $GdBO_3$:Tb, $(Y_{1-x}Gd_x)BO_3$:Tb, with $0 \leq x \leq 1$, $YBO_3$:Tb, LaOCl:Tb, or $InBO_3$:Tb.

As is shown in Table 2, all selected $Tb^{3+}$-activated phosphors except $InBO_3$:Tb have a shorter decay time than $Zn_2SiO_4$:Mn. $Tb^{3+}$-activated phosphors are temperature- und photostable, because $Tb^{3+}$ can be oxidized to $Tb^{4+}$ with difficulty only. In addition, these $Tb^{3+}$-activated phosphors show a high luminous efficacy upon irradiation with VUV light.

TABLE 2

Decay times and color points of
suitable $Tb^{3+}$-activated phosphors

| Phosphor | Decay Time [ms] | Color Point [x, y] |
|---|---|---|
| $LaPO_4$:Ce, Tb | 7.5 | 0.352, 0.580 |
| $Y_2SiO_5$:Tb | 5.0 | 0.331, 0.584 |
| $GdMgB_5O_{10}$:Ce, Tb | 5.5 | 0.343, 0.585 |
| $CeMgAl_{11}O_{19}$:Tb | 7.0 | 0.329, 0.605 |
| $GdBO_3$:Tb | 8.0 | 0.336, 0.612 |
| $(Y_{0.5}Gd_{0.5})BO_3$:Tb | 8.0 | 0.338, 0.615 |
| $YBO_3$:Tb | 8.0 | 0.338, 0.615 |
| $InBO_3$:Tb | 16.0 | 0.331, 0.621 |

A red-emitting color segment of the phosphor layer 9 comprises a mixed particle mixture of $(Y,Gd)BO_3$:Eu and a second red-emitting phosphor whose color point (x,y) has a y-value of <0.36. The second red-emitting phosphor used may be, for example, $Y_2O_3$:Eu, $YVO_4$:Eu, $Y(V,P)O_4$:Eu and $(Y_{1-x}Gd_x)_2O_3$:Eu, with $0 \leq x \leq 1$.

As Table 3 shows, the listed phosphors have an emission which lies more in the red region of the color triangle than the emission of $(Y,Gd)BO_3$:Eu. In addition, these phosphors have a short decay time.

TABLE 3

Decay times and color points of suitable
red-emitting $Eu^{2+}$-activated phosphors

| Phosphor | Decay Time [ms] | Color Point [x, y] |
|---|---|---|
| $Y_2O_3$:Eu | 2.5 | 0.642, 0.344 |
| $YVO_4$:Eu | 3.5 | 0.658, 0.326 |
| $Y(V, P)O_4$:Eu | 3.5 | 0.662, 0.328 |
| $(Y_{0.5}Gd_{0.5})_2O_3$:Eu | 2.5 | 0.650, 0.337 |

The proportional quantity of $BaMgAl_{10}O_{17}$:Eu (BAM), $Zn_2SiO_4$:Mn (ZSM) and $(Y,Gd)BO_3$:Eu, as applicable, in a color segment lies between 1 and 99% of the total quantity of phosphors in this color segment.

Figure 2:
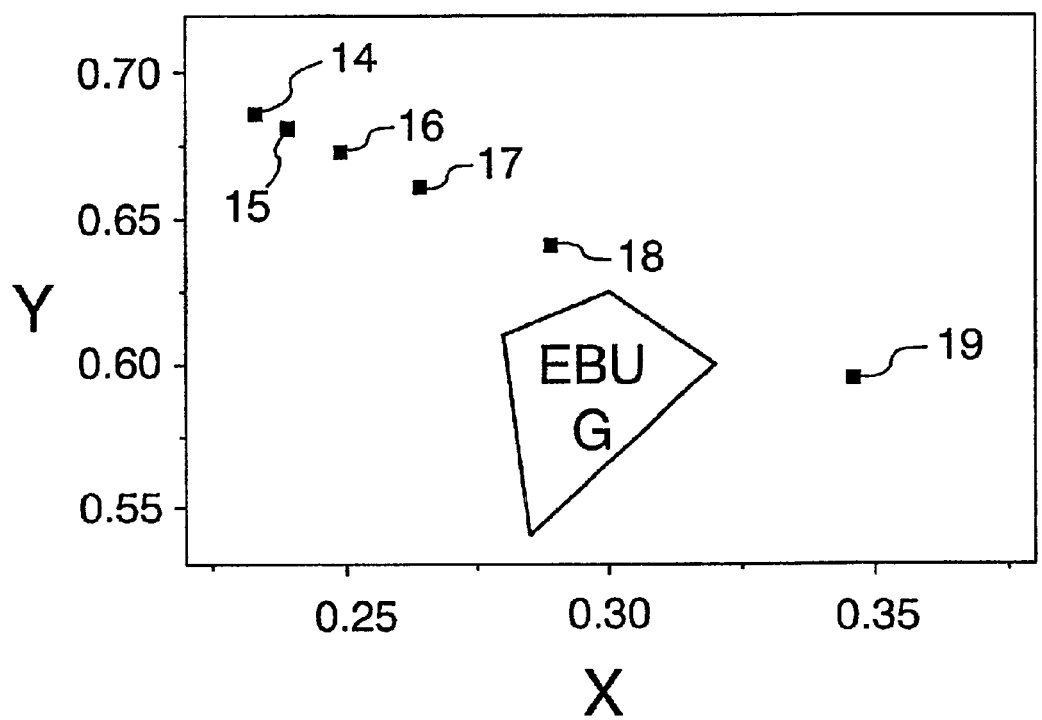
FIG. 2 shows the shift in color point of a green-emitting phosphor segment in a plasma picture screen whose gas comprises a mixture of 10% by volume of Xe and 90% by volume of Ne, in dependence on the proportional quantities of $Zn_2SiO_4$:Mn and $(Y_{0.5}Gd_{0.5})BO_3$:Tb.

FIG. 2 shows the shift in color point of a green-emitting phosphor segment in a plasma picture screen whose gas comprises a mixture of 10% by volume of Xe and 90% by volume of Ne, in dependence on the proportional quantities of $Zn_2SiO_4$:Mn and $(Y_{0.5}Gd_{0.5})BO_3$:Tb. The color point 14 relates to a green-emitting phosphor segment which comprises up to 100% $Zn_2SiO_4$:Mn, and the color point 19 relates to a phosphor segment which comprises up to 100% $(Y_{0.5}Gd_{0.5})BO_3$:Tb. The color points 15 to 18 are the color points of green-emitting phosphor segments which comprise a mixed particle mixture of $Zn_2SiO_4$:Mn and $(Y_{0.5}Gd_{0.5})BO_3$:Tb. The assignation of the color points to the respective proportional quantities of the phosphors in the green-emitting phosphor segment is shown in Table 4. EBU G denotes the EBU standard for green.

TABLE 4

Meanings of color points 15 to 18

| Color Point No. | Proportional Quantities of Phosphors |
|---|---|
| 15 | 80% $Zn_2SiO_4$:Mn, 20% $(Y_{0.5}Gd_{0.5})BO_3$:Tb |
| 16 | 60% $Zn_2SiO_4$:Mn, 40% $(Y_{0.5}Gd_{0.5})BO_3$:Tb |
| 17 | 40% $Zn_2SiO_4$:Mn, 80% $(Y_{0.5}Gd_{0.5})BO_3$:Tb |
| 18 | 20% $Zn_2SiO_4$:Mn, 20% $(Y_{0.5}Gd_{0.5})BO_3$:Tb |

Figure 3:
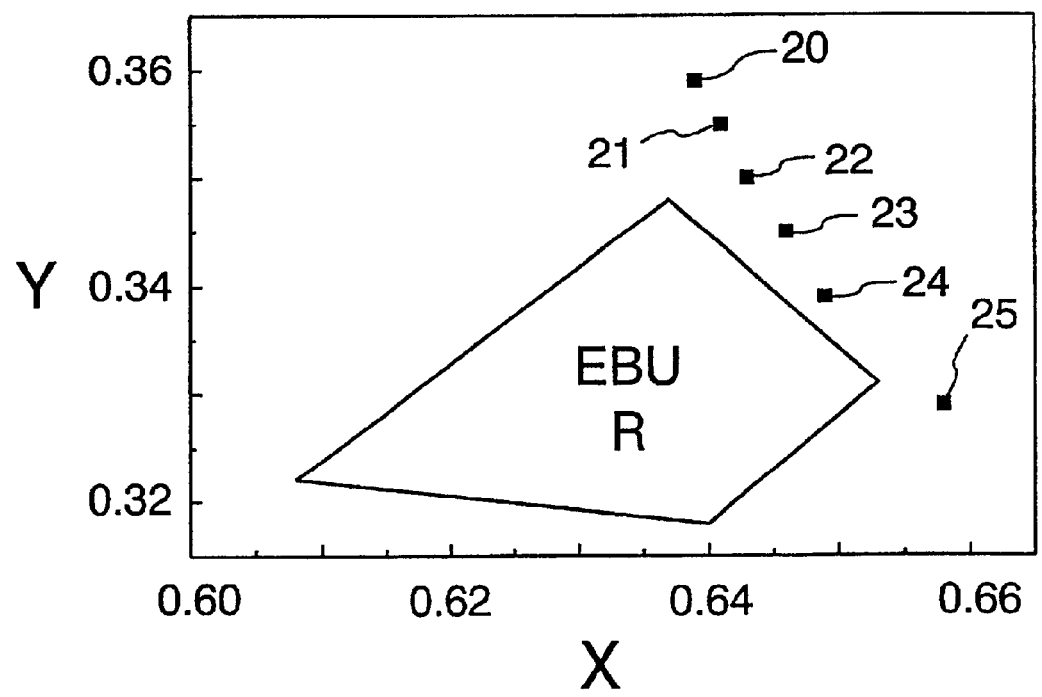
FIG. 3 shows the shift in color point of a red-emitting phosphor segment in a plasma picture screen whose gas comprises a mixture of 10% by volume of Xe and 90% by volume of Ne, in dependence on the proportional quantities of (Y,Gd)$BO_3$:Eu and Y(V,P)$O_4$:Eu.
Figure 4:
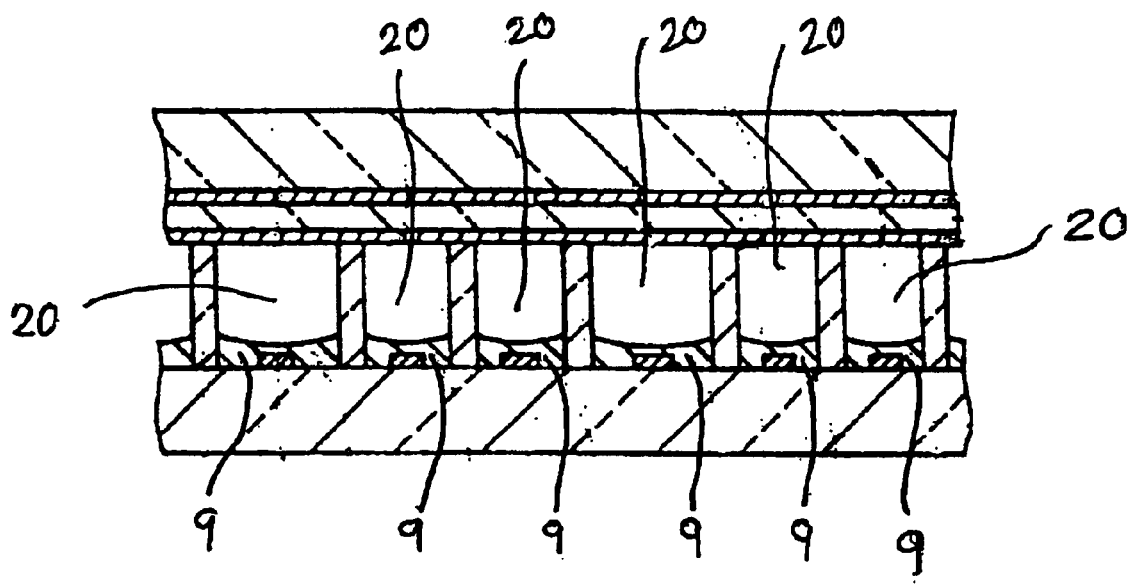
FIG. 4 shows several different color segments of an AC plasma picture screen.

FIG. 3 shows the shift in color point of a red-emitting phosphor segment in a plasma picture screen whose gas comprises a mixture of 10% by volume of Xe and 90% by volume of Ne, in dependence on the proportional quantities of $(Y,Gd)BO_3$:Eu and $Y(V,P)O_4$:Eu. The color point 20 relates to a red-emitting phosphor segment which comprises up to 100% of $(Y,Gd)BO_3$:Eu, and the color point 25 relates to a red-emitting phosphor segment which comprises up to 100% of $Y(V,P)O_4$:Eu. The color points 21 to 14 are the color points of red-emitting phosphor segments which comprise a mixed particle mixture of $(Y,Gd)BO_3$:Eu and $Y(V,P)O_4$:Eu. The assignation of the color points to the respective proportional quantities of the phosphors in the red-emitting phosphor segments is given in Table 5. EBU R denotes the EBU standard for red.

TABLE 5

Meanings of color points 21 to 24

| Color Point No. | Proportional Quantities of Phosphors |
|---|---|
| 21 | 80% $(Y, Gd)BO_3$:Eu, 20% $Y(V, P)O_4$:Eu |
| 22 | 60% $(Y, Gd)BO_3$:Eu, 40% $Y(V, P)O_4$:Eu |
| 23 | 40% $(Y, Gd)BO_3$:Eu, 80% $Y(V, P)O_4$:Eu |
| 24 | 20% $(Y, Gd)BO_3$:Eu, 20% $Y(V, P)O_4$:Eu |

Suitable manufacturing processes for a phosphor layer 9 subdivided into several color segments are dry coating methods, for example electrostatic deposition or electrostatically supported dusting, as well as wet coating methods, for example silk screen printing, dispensing processes, in which a suspension is introduced from a nozzle moving along the channels, or sedimentation from the liquid phase.

For the wet coating methods, the two phosphors of a color segment must be dispersed in water, an organic solvent, possibly together with a dispersing agent, a surfactant and an anti-foaming agent, or a binder preparation. Inorganic binders capable of withstanding operating temperature of 250° C. without decomposition, brittling, or discoloration, or organic binders which can be subsequently removed through oxidation are suitable for use in binder preparations for plasma picture screens.

After the phosphor layer 9 has been provided on a carrier plate 2 comprising address electrodes 10 and a ribbed structure 12 with separating ribs, the carrier plate 2 is assembled together with other components such as, for example, a front plate 1 and a rare gas mixture, so as to manufacture a plasma picture screen. The rare gas mixture may comprise xenon in a quantity of between 5 and 30% by volume, preferably of 10% by volume.

One or several color segments in a plasma picture screen may comprise a mixed particle mixture of at least two phosphors which emit the same color. It is particularly preferred that each color segment in a plasma picture screen having red-, green-, and blue-emitting color segments in its phosphor layer 9 should comprise a mixed particle mixture of at least two phosphors which emit the same color.

Alternatively, a monochrome plasma picture screen may be manufactured. In that case the phosphor layer 9 comprises only one mixed particle mixture of at least two phosphors which emit the same color.

Embodiments of the invention are discussed in more detail below, representing examples of how the invention may be implemented in practice.

Embodiment 1

For the manufacture of a plasma picture screen, a silk screen printing paste was first prepared, with 30% by weight of $(Y,Gd)BO_3$:Tb, 20% by weight of $Zn_2SiO_4$:Mn and 50% of an organic binder. The paste was provided on a carrier plate 2 of glass with a ribbed structure 12 and address electrodes of Ag in a segmented manner by means of silk screen printing and was dried. This process step was carried out in succession for the other two phosphor types with the emission colors red and blue. The silk screen printing paste for the red color segments comprised 50% by weight of $(Y,Gd)BO_3$:Eu and 50% by weight of an organic binder. The silk screen printing paste for the blue color segments comprised 50% by weight of $BaMgAl_{10}O_{17}$:Eu and 50% by weight of an organic binder.

All additives remaining in the phosphor layer 9 were removed through a thermal treatment of the carrier plate 2 at 400 to 600° C. in an atmosphere containing oxygen.

This carrier plate 2 was used together with a glass front plate comprising a dielectric layer 4 of glass containing PbO, a protective layer 5 of MgO, and discharge electrodes 6, 7 of ITO for assembling an AC plasma picture screen. A mixture of 10% by volume of Xe and 90% by volume of Ne was used for the gas filling.

The color point of the green pixels of the plasma picture screen thus obtained lay at x=0.264 and y=0.661. The plasma picture screen had a higher luminous efficacy and an improved peak luminance.

Embodiment 2

For the manufacture of a plasma picture screen, a silk screen printing paste was first prepared, with 30% by weight of $(Y,Gd)BO_3$:Eu, 20% by weight of $Y(V,P)O_4$:Eu, and 50% of an organic binder. The paste was provided on a carrier plate 2 of glass with a ribbed structure 12 and address electrodes of Ag in a segmented manner by means of silk screen printing and dried. This process step was carried out in succession for the other two phosphor types with the emission colors green and blue. The silk screen printing paste for the green color segments comprised 50% by weight of $Zn_2SiO_4$:Mn and 50% by weight of an organic binder. The silk screen printing paste for the blue color segments comprised 50% by weight of $BaMgAl_{10}O_{17}$:Eu and 50% by weight of an organic binder.

All additives remaining in the phosphor layer 9 were removed through a thermal treatment of the carrier plate 2 at 400 to 600° C. in an atmosphere containing oxygen.

This carrier plate 2 was used together with further components as described with reference to embodiment 1 for assembling a plasma picture screen.

The color point of the red pixels of the plasma picture screen thus obtained lay at x=0.646 and y=0.345.

Embodiment 3

For the manufacture of a plasma picture screen, a silk screen printing paste was first prepared, with 30% by weight of $BaMgAl_{10}O_{17}$:Eu, 20% by weight of $YBO_3$:Ce, and 50% of an organic binder. The paste was provided on a carrier plate 2 of glass with a ribbed structure 12 and address electrodes of Ag in a segmented manner by means of silk screen printing and dried. This process step was carried out in succession for the other two phosphor types with the emission colors red and green. The silk screen printing paste for the green color segments comprised 50% by weight of $Zn_2SiO_4$:Mn and 50% by weight of an organic binder. The silk screen printing paste for the red color segments comprised 50% by weight of $(Y,Gd)BO_3$:Eu and 50% by weight of an organic binder.

All additives remaining in the phosphor layer 9 were removed through a thermal treatment of the carrier plate 2 at 400 to 600° C. in an atmosphere containing oxygen.

This carrier plate 2 was used together with further components as described with reference to embodiment 1 for assembling a plasma picture screen.

The color point of the blue pixels of the plasma picture screen thus obtained lay at x=0.152 and y=0.050.

Embodiment 4

For the manufacture of a plasma picture screen, a silk screen printing paste was first prepared, with 30% by weight of $(Y,Gd)BO_3$:Tb, 20% by weight of $Zn_2SiO_4$:Mn and 50% of an organic binder. The paste was provided on a carrier plate 2 of glass with a ribbed structure 12 and address electrodes of Ag in a segmented manner by means of silk screen printing and dried. This process step was carried out in succession for the other two phosphor types with the emission colors red and blue. The silk screen printing paste for the red color segments comprised 30% by weight of $(Y,Gd)BO_3$:Eu, 20% by weight of $Y(V,P)O_4$:Eu, and 50% by weight of an organic binder. The silk screen printing paste for the blue color segments comprised 30% by weight of $BaMgAl_{10}O_{17}$:Eu, 20% by weight of $YBO_3$:Ce, and 50% by weight of an organic binder.

All additives remaining in the phosphor layer 9 were removed through a thermal treatment of the carrier plate 2 at 400 to 600° C. in an atmosphere containing oxygen.

This carrier plate 2 was used together with further components as described with reference to embodiment 1 for assembling an improved plasma picture screen.

What is claimed is:

1. A plasma picture screen, comprising:
    a front glass plate on which a dielectric layer and a protective layer are provided;
    a carrier plate provided with a phosphor layer comprising a mixed particle mixture of at least two phosphors that emit the same color;
    a ribbed structure which subdivides the space between the front plate and the carrier plate into plasma cells filled with a gas; and
    one or several electrode arrays on the front plate and the carrier plate for generating electrical corona discharges in the plasma cells,
    wherein the phosphor layer is subdivided into individual color segments, and at least one segment comprises a mixed particle mixture of at least two phosphors that emit the same color, and
    wherein a color segment of the phosphor layer comprises a mixed particle mixture of $BaMgAl_{10}O_{17}$:Eu and a phosphor chosen from the group of $Ce^{3+}$-activated phosphors and Tm3+-activated phosphors.

2. A plasma picture screen as claimed in claim 1, wherein the $Ce^{3+}$-activated phosphor is chosen from the group of $YBO_3$:Ce and $(Y_{1-x}Gd_x)BO_3$:Ce, with $0 \leq x \leq 1$.

3. A plasma picture screen as claimed in claim 1, wherein the Tm3+-activated phosphor is $LaBO_3$:Tm.

4. A plasma picture screen, comprising:
    a front glass plate on which a dielectric layer and a protective layer are provided;
    a carrier plate provided with a phosphor layer comprising a mixed particle mixture of at least two phosphors that emit the same color;
    a ribbed structure which subdivides the space between the front plate and the carrier plate into plasma cells filled with a gas; and
    one or several electrode arrays on the front plate and the carrier plate for generating electrical corona discharges in the plasma cells, wherein the phosphor layer is subdivided into individual color segments, and at least one segment comprises a mixed particle mixture of at least two phosphors that emit the same color, and wherein a color segment of the phosphor layer comprises a mixed particle mixture of $(Y,Gd)BO_3$:Eu and a second red-emitting phosphor whose color point (x,y) has a y-value <0.38.

5. A plasma picture screen as claimed in claim 4, wherein the second red-emitting phosphor is chosen from the group of $Y_2O_3$:Eu, $YVO_4$:Eu, $Y(V,P)O_4$:Eu and $(Y_{1-x}Gd_x)_2O_3$:Eu, with $0 \leq x \leq 1$.

6. A plasma display device, comprising:
a front glass plate on which a dielectric layer and a protective layer are provided;
a carrier plate provided spaced apart and opposing the front carrier plate;
a phosphor layer disposed on the carrier plate, the phosphor layer being subdivided into individual red, blue, and green color segments;
a ribbed structure which subdivides the space between the front plate and the carrier plate into plasma cells which are filled with a gas; and
an electrode arrays on the front plate and the carrier plate for generating electrical corona discharges in the plasma cells,
wherein each of the red color segments includes a mixed particle mixture of at least two different phosphors which both emit red colored light, each of the green color segments includes a mixed particle mixture of at least two different phosphors which both emit green colored light, and each of the blue color segments includes a mixed particle mixture of at least two different phosphors which both emit blue colored light.

7. The plasma display device of claim 6, wherein each of the blue color segments of the phosphor layer comprises a mixed particle mixture of $BaMgAl_{10}O_{17}$:Eu and a phosphor chosen from the group of $Ce^{3+}$-activated phosphors and Tm3+-activated phosphors.

8. The plasma display device of claim 7, wherein each of the red color segments of the phosphor layer comprises a mixed particle mixture of $(Y,Gd)BO_3$:Eu and a second red-emitting phosphor whose color point (x,y) has a y-value <0.36.

9. The plasma display device of claim 8, wherein each of the green color segments of the phosphor layer comprises a mixed particle mixture of $Zn_2SiO_4$:Mn and a $Tb^{3+}$-activated phosphor.

10. The plasma display device of claim 8, wherein the second red-emitting phosphor is chosen from the group of $Y_2O_3$:Eu, $YVO_4$:Eu, $Y(V,P)O_4$:Eu and $(Y_{1-x}Gd_x)_2O_3$:Eu, with $0 \leq x \leq 1$.

11. The plasma display device of claim 6, wherein each of the red color segments of the phosphor layer comprises a mixed particle mixture of $(Y,Gd)BO_3$:Eu and a second red-emitting phosphor whose color point (x,y) has a y-value <0.36.

12. The plasma display device of claim 11, wherein the second red-emitting phosphor is chosen from the group of $Y_2O_3$:Eu, $YVO_4$:Eu, $Y(V,P)O_4$:Eu and $(Y_{1-x}Gd_x)_2O_3$Eu, with $0 \leq x \leq 1$.

13. The plasma display device of claim 6, wherein each of the green color segments of the phosphor layer comprises a mixed particle mixture of $Zn_2SiO_4$:Mn and a $Tb^{3+}$-activated phosphor.

* * * * *